(12) United States Patent
Yu et al.

(10) Patent No.: US 11,429,491 B2
(45) Date of Patent: Aug. 30, 2022

(54) SOURCE-SIDE ACCELERATED INDEXING FOR DATA PROTECTION SEARCH

(71) Applicant: EMC IP Holding Company LLC, Hopkinton, MA (US)

(72) Inventors: Jing Yu, Shanghai (CN); Mengze Liao, Shanghai (CN); Yongsheng Guo, Nanjing (CN); Adam Brenner, Mission Viejo, CA (US); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 802 days.

(21) Appl. No.: 16/172,563

(22) Filed: Oct. 26, 2018

(65) Prior Publication Data
US 2020/0133785 A1   Apr. 30, 2020

(51) Int. Cl.
  *G06F 16/00* (2019.01)
  *G06F 11/14* (2006.01)
  *G06F 16/13* (2019.01)
  *G06F 16/14* (2019.01)

(52) U.S. Cl.
  CPC ...... *G06F 11/1451* (2013.01); *G06F 11/1435* (2013.01); *G06F 11/1464* (2013.01); *G06F 16/13* (2019.01); *G06F 16/14* (2019.01)

(58) Field of Classification Search
  CPC .................................. G06F 16/14; G06F 16/13
  USPC ......................................... 707/706, 610, 649
  See application file for complete search history.

(56) References Cited

U.S. PATENT DOCUMENTS

| | | | |
|---|---|---|---|
| 7,680,835 B2 * | 3/2010 | MacLaurin | G06F 16/10 709/248 |
| 2009/0024596 A1 * | 1/2009 | Basso | G06F 16/48 |
| 2013/0166511 A1 * | 6/2013 | Ghatty | G06F 11/1469 707/649 |

* cited by examiner

*Primary Examiner* — Chelcie L Daye
(74) *Attorney, Agent, or Firm* — Womble Bond Dickinson (US) LLP

(57) ABSTRACT

A method, apparatus, and system for storing indexed metadata associated with backed up data is provided. The operations comprising: for each first data item stored at a first client device to be backed up, extracting, at the first client device, an associated first metadata item; transforming, at the first client device, the first metadata item based on a predefined metadata definition; associating, at the first client device, a first client identifier and a backup identifier with the transformed first metadata item; and transferring the transformed first metadata item from the first client device to a metadata bus of a search cluster.

18 Claims, 7 Drawing Sheets

SOURCE-SIDE ACCELERATED INDEXING FOR DATA PROTECTION SEARCH

FIELD OF THE INVENTION

Embodiments of the present invention relate generally to data storage systems. More particularly, embodiments of the invention relate to storing searchable metadata associated with a backup.

BACKGROUND

In a data backup storage system, metadata associated with backed up files is stored and made searchable. As the amount of data to be backed up grows, synchronization of metadata between the backup software and the search software can become a challenge.

The issue is further exacerbated by the fact that in a conventional data backup storage system, the metadata node is not scalable. The drawback associated with metadata synchronization is most acutely felt after data change (e.g., after a scheduled backup), as the customers expect the searchable metadata to reflect the data change in real-time.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A method, apparatus, and system for storing indexed metadata associated with backed up data is provided. The operations comprising: for each first data item stored at a first client device to be backed up, extracting, at the first client device, an associated first metadata item; transforming, at the first client device, the first metadata item based on a predefined metadata definition; associating, at the first client device, a first client identifier and a backup identifier with the transformed first metadata item; and transferring the transformed first metadata item from the first client device to a metadata bus of a search cluster.

Figure 1:
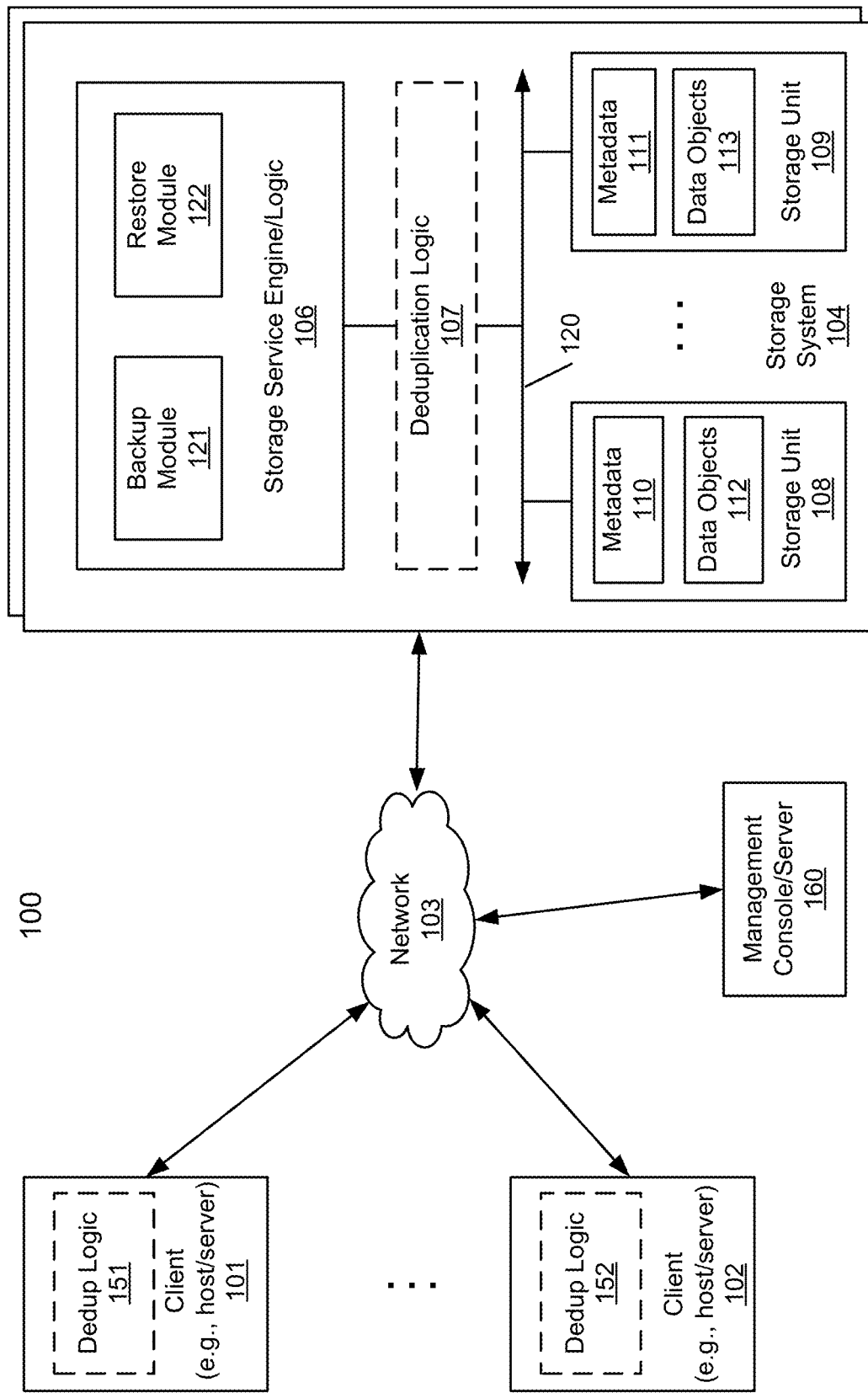
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
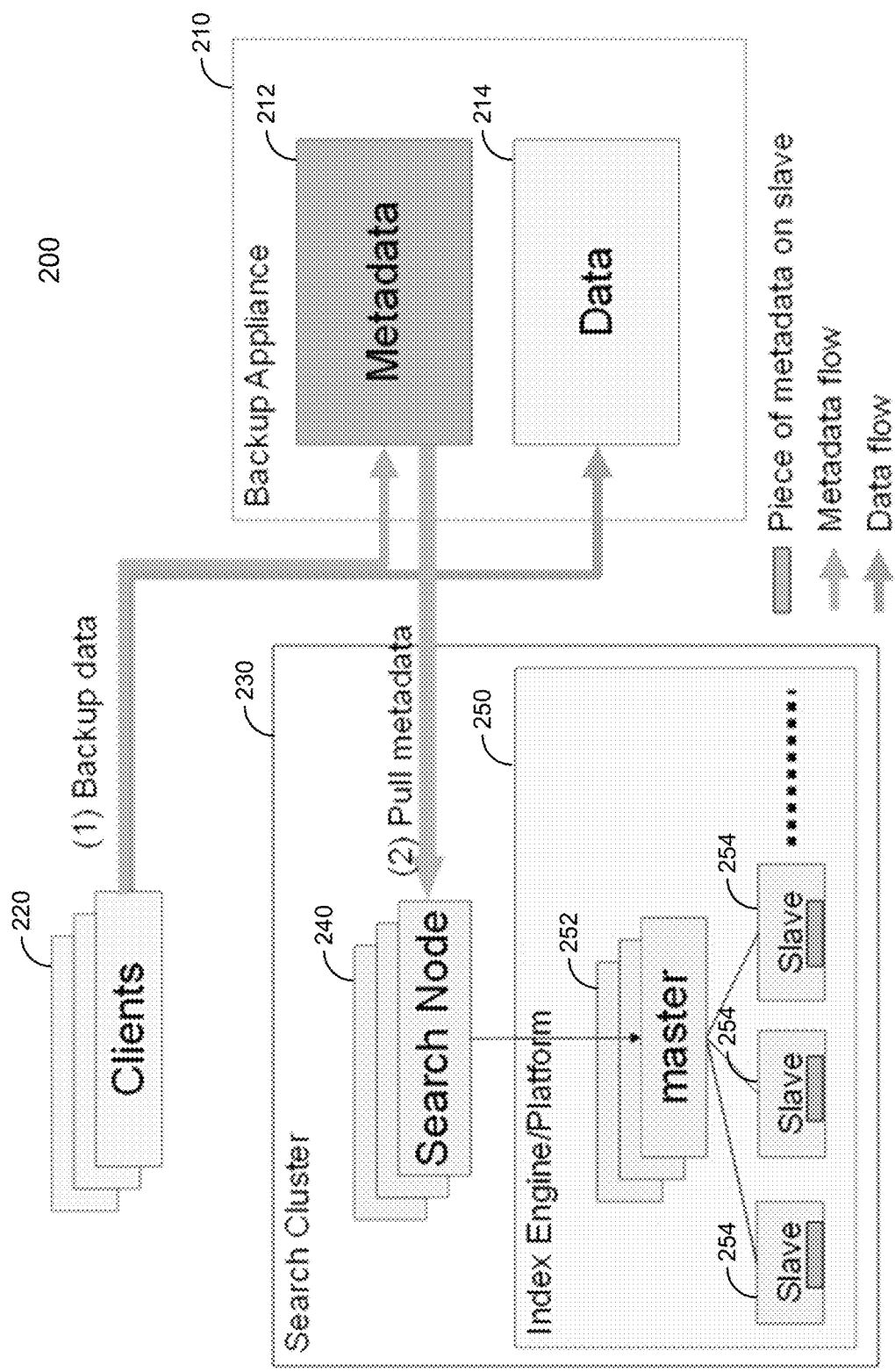
FIG. 2 is a block diagram illustrating a prior art implementation of a backup data storage system.

Referring to FIG. 2, a block diagram 200 illustrating a prior art implementation of a backup data storage system is shown. As illustrated in FIG. 2, a backup appliance 210 refers to a unit that orchestrates and stores data backups (e.g., files, databases, virtual machines, etc.), and can be implemented with a physical machine, a virtual machine, a cluster of physical machines, a cluster of virtual machines, or any combination thereof. Each of the one or more clients 220, which can be implemented with either a physical machine or a virtual machine, is adapted to process work orders received from the backup appliance 210 and transfer the demanded data to the backup appliance 210. A search cluster 230 comprises nodes of different types and provides the capability of storing, indexing, and searching metadata associated with backed up data. Within the search cluster 230, each of one or more search nodes 240, which can be implemented with either a physical machine or a virtual machine, is adapted to serve the Search and Administration application programming interfaces (APIs). In particular, the search nodes 240 may provide orchestration functions, and may collect metadata from different sources (e.g., the backup appliance 210), and transfer the metadata to an index engine/platform 250. The index engine/platform 250 comprises one or more master nodes 252, each of which is further associated with one or more slave (data) nodes 254. Each master node 252 is responsible for lightweight cluster-side actions, such as creating or deleting an index, tracking which nodes are part of the cluster, and/or deciding which shards of metadata to allocate to which nodes, etc. The slave (data) nodes 254 hold the shards of indexed metadata, and handles operations such as create, read, update, and delete (CRUD), search, and/or aggregation, etc.

In the prior art implementation illustrated in FIG. 2, clients 220 first send both the data to be backed up and the associated metadata to the backup appliance 210, whereupon the backup appliance 210 stores therein both the backed up data 214 and the associated metadata 212. Thereafter, the search cluster 230, via the search nodes 240, retrieves the metadata 212 from the backup appliance 210. The metadata is then indexed by the index engine/platform 250, and stored at the slave nodes 254.

The prior art approach described above is associated with a number of drawbacks. For example, the search index cannot be generated in real-time during a backup. A heavy workload is created on the backup appliance when the search nodes retrieve metadata from it. Further, the metadata is unnecessarily stored as duplicates—one copy in the backup appliance and another copy in the search cluster. A heavy workload is also experienced by the search nodes. Moreover, the metadata can only be indexed on a backup granularity (i.e., metadata indexing is performed for each backup as a whole), which can be inefficient for large backups. There drawbacks can be especially disadvantageous in a large filesystem, such as a network-attached storage (NAS) filesystem, which can have millions of files.

Therefore, according to one embodiment of the disclosure, the search cluster may be adapted to serve as a unified metadata scale-out server. A unified metadata definition may be used for both backup and restore operations as well as search and restore operations. A metadata bus may be used to enable load balancing for CRUD operations.

Figure 3:
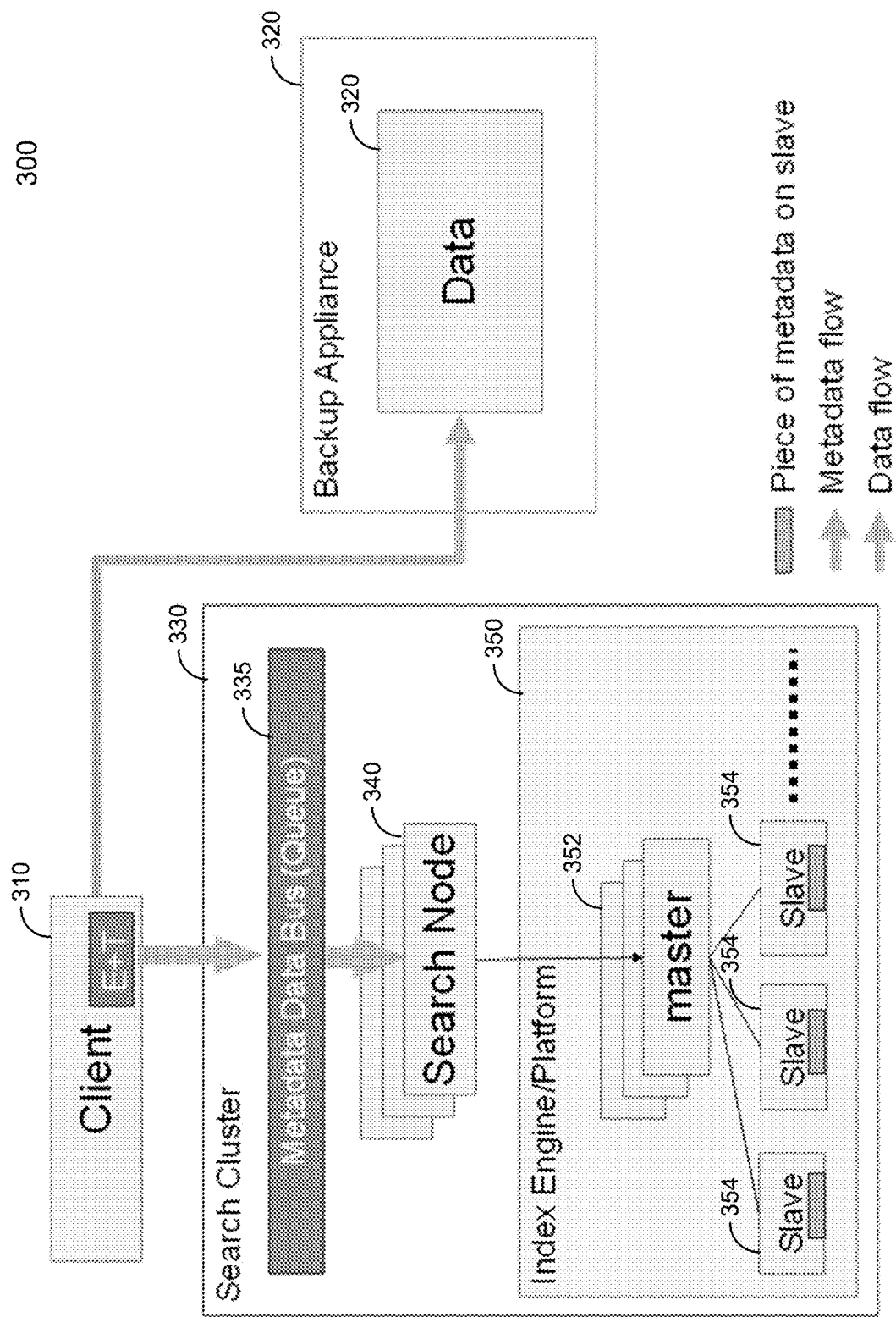
FIG. 3 a block diagram illustrating an example backup data storage system according to one embodiment.

Referring to FIG. 3, a block diagram 300 illustrating an example backup data storage system according to one embodiment is shown. Compared to the components illustrated in FIG. 2 with the same names, the components illustrated in FIG. 3 (e.g., client 310, backup appliance 320, search cluster 330, search nodes 340, index engine/platform 350, master nodes 352, slave nodes 354, etc.) may perform similar functions, unless otherwise specified. During a backup, the client 310 performs an extract and transform (E+T) operation to separate (extract) the associated metadata from the data to be backed up and format (transform) the metadata into semi-structured data items based on a pre-defined unified metadata definition. From the client 310, only data to be backed up is transferred to the backup appliance 320, whereupon the data 320 is saved therein. The transformed metadata is transferred from the client 310 only to the search cluster 330. In particular, the transformed metadata items are entered into a metadata bus 335 at the search cluster 330, which is implemented as a buffer, and form therein a metadata queue. Instead of collecting metadata from the backup appliance 320, the search nodes 340 of FIG. 3 retrieve transformed metadata items from the metadata bus 335 and transfer the metadata items to the index engine/platform 350 for storage.

Therefore, as each client is only responsible for extracting and transforming its own metadata, the extract and transform operations are performed in a distributed fashion. The metadata queue, which can be either distributed or standalone, provides a buffer between the extract and transform operations performed at clients and the metadata collection performed by the search nodes. In other words, the search nodes retrieve metadata items from the metadata queue, and the metadata items that have been retrieved by a search node is removed from the metadata queue.

It should be appreciated that backup data storage system according to one embodiment as illustrated in FIG. 3 is associated with a number of advantages. First, the search index is created in real-time during a backup. The backup appliance is spared the workload associated with saving the metadata or transferring the metadata to the search nodes. Further, only one copy of the metadata is stored—no unnecessary duplicate is created. As each client performs the transform operations, the computing workload that otherwise would have to be performed by the search nodes is distributed to the clients. This is more efficient because typically the number of clients is much greater than the number of search nodes. Moreover, as the transform operations are performed at the clients, the indexing can be efficiently performed on a file granularity.

Figure 4:
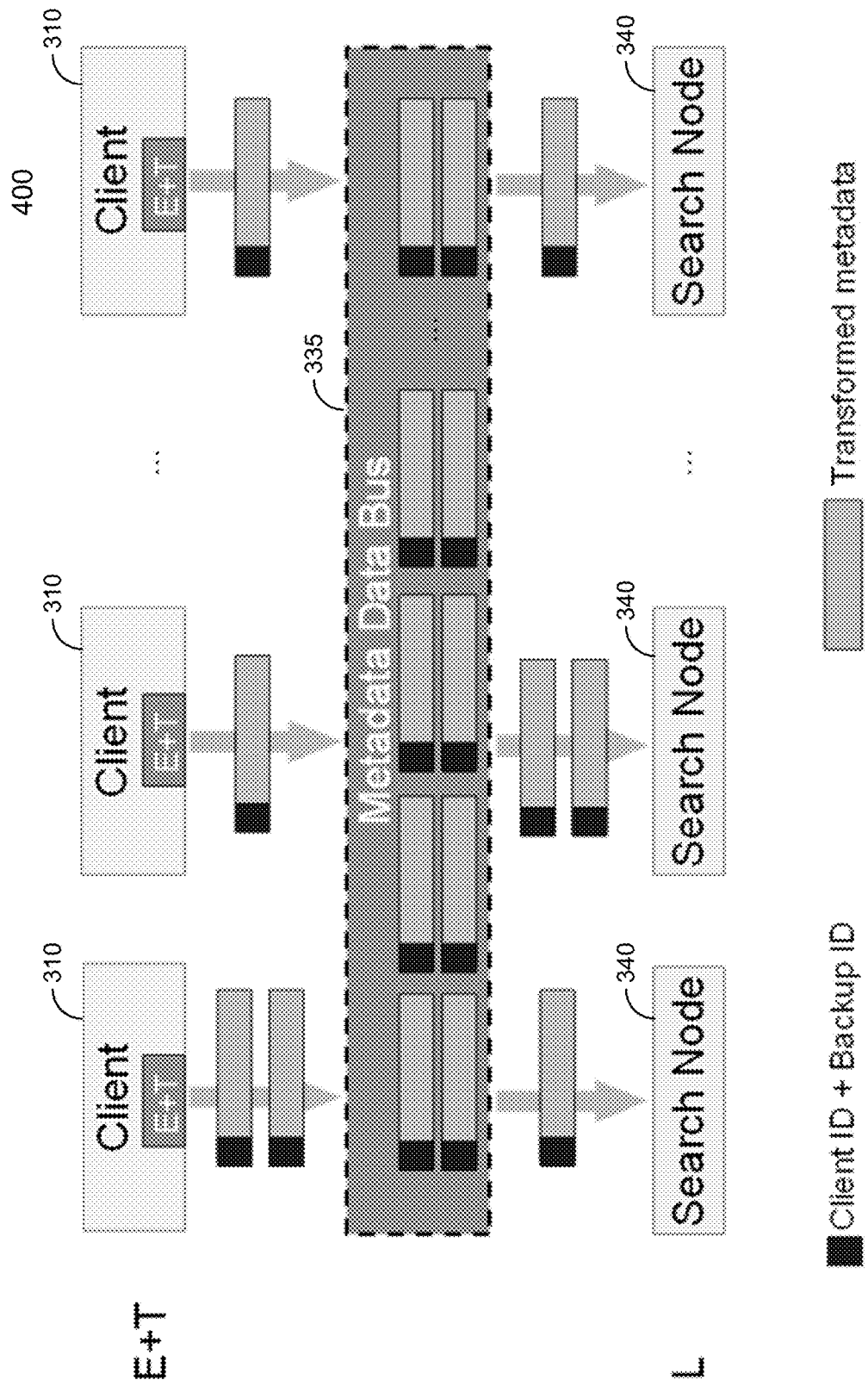
FIG. 4 is a block diagram illustrating a metadata bus implementation according to one embodiment.

Referring to FIG. 4, a block diagram 400 illustrating a metadata bus implementation according to one embodiment is shown. Each client 310 performs extract and transform operations during a backup. Each client further appends a client identifier and a backup identifier to each transformed metadata item. In one embodiment, a single transformed metadata item may comprise metadata associated with a plurality of files. It should be appreciated that a combination of a client identifier and a backup identifier uniquely identifies a target index of a metadata item. The transformed metadata items, each being associated with a client identifier and a backup identifier, are entered into the metadata bus 335. The metadata queue stored at the metadata bus 335 may be either a centralized or a distributed queue. In different embodiments, the metadata bus 335 may be integrated with the search nodes 340 (i.e., executed on the same physical/virtual machine), or may be implemented separately from the search nodes 340. The search nodes 340 then perform load (L) operations. In particular, search nodes 340 retrieve the transformed metadata items from the metadata bus 335, and transfer the transformed metadata items to the index engine/platform for storage. The transformed metadata items stored at the index engine/platform are user searchable. Metadata items that have been retrieved by a search node 340 are removed from the metadata bus 335.

Figure 5:
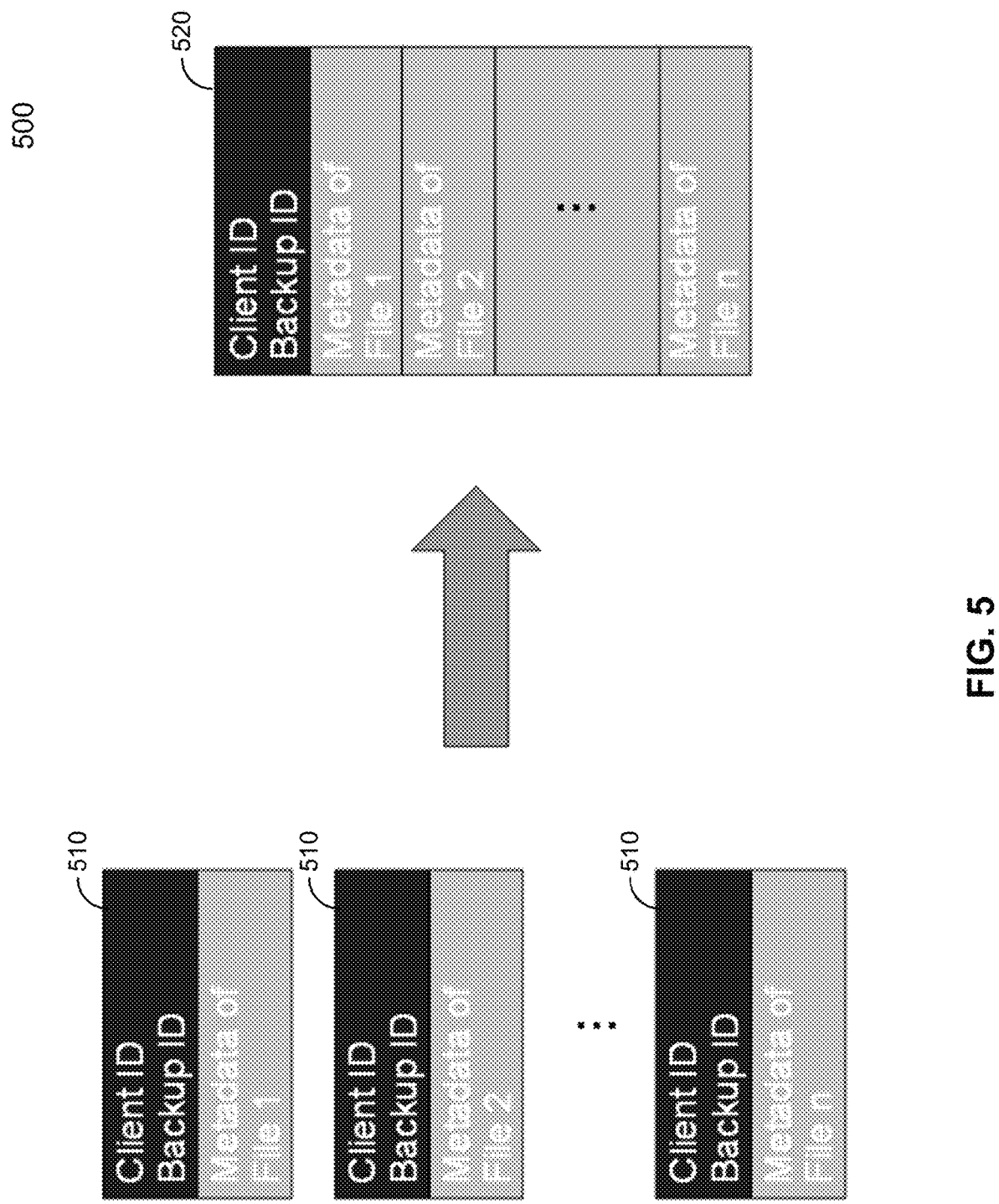
FIG. 5 is a diagram illustrating an example method for batching metadata items according to one embodiment.

Referring to FIG. 5, a diagram 500 illustrating an example method for batching metadata items according to one embodiment is shown. Each metadata item 510 comprises metadata associated with a single file (File 1, File 2 . . . File n). As all the metadata items 510 are associated with the same client identifier and the same backup identifier, they share a same target index in the index engine/platform. Accordingly, the metadata items 510 can be combined into a single combined metadata item 520. The combined metadata item 520 comprises metadata of all the individual metadata items 510, and is associated with the shared client identifier and backup identifier. It should be appreciated that batching the individual metadata items 510 and storing the resultant combined metadata item 520 reduce overhead.

In one embodiment, flood control operations may be performed on the metadata queue. In particular, the metadata queue may be stored in a memory as a first tier. Once the memory becomes full, additional data may be swapped to a disk. The number of search nodes may be increased (i.e., by brining additional search nodes online) in order to accelerate the handling of the metadata items in the metadata queue, if the actual speed of the handling is below a desired speed. On the other hand, if the metadata queue is not full, or if the number of metadata items in the metadata queue is below a threshold, the number of search nodes may be reduced (e.g., by taking some search nodes offline).

Figure 6:
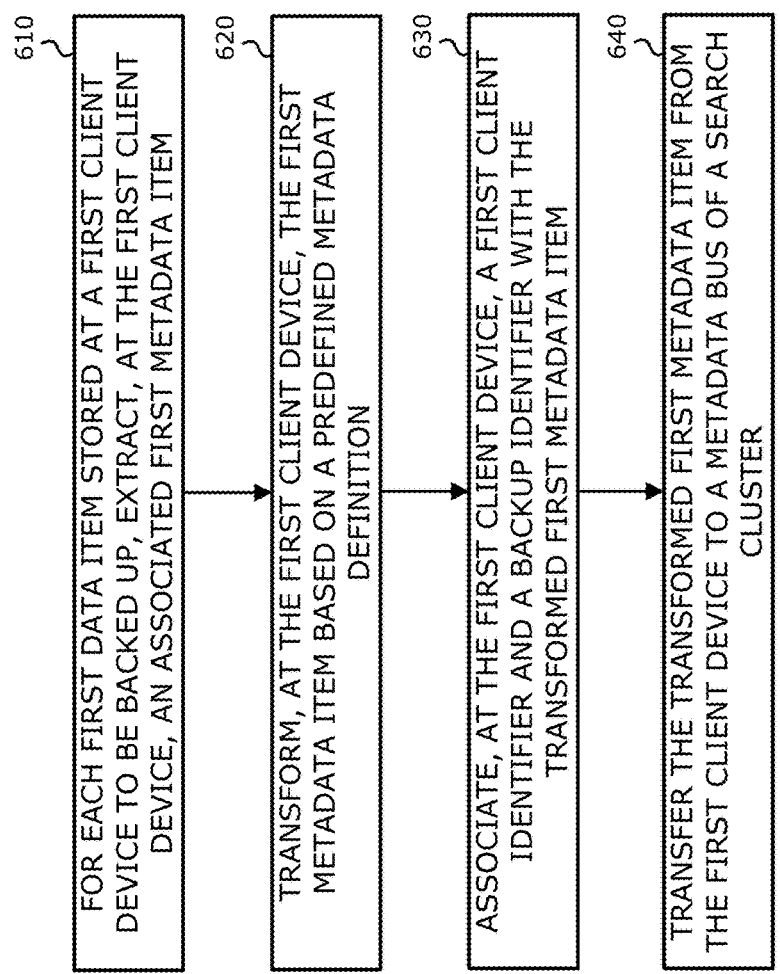
FIG. 6 is a flowchart illustrating an example method for storing indexed metadata associated with backed up data according to one embodiment.

Referring to FIG. 6, a flowchart illustrating an example method 600 for storing indexed metadata associated with backed up data according to one embodiment is shown. The method 600 may be performed by processing logic that includes hardware (e.g. circuitry, dedicated logic, etc.), software (e.g., embodied on a non-transitory computer readable medium), or a combination thereof. For example, method 600 may be performed by processor(s) 1501 of FIG. 7. At block 610, for each first data item stored at a first client device to be backed up, an associated first metadata item is extracted at the first client device. At block 620, the first metadata item is transformed at the first client device based on a predefined metadata definition. At block 630, a first client identifier and a backup identifier are associated with the transformed first metadata item at the first client device. At block 640, the transformed first metadata item is transferred from the first client device to a metadata bus of a search cluster.

In one embodiment, the first data item to be backed up is a file. The first data item to be backed up may be transferred from the first client device to a backup appliance. A search node of the search cluster may retrieve the transformed first metadata item from the metadata bus and transfer the transformed first metadata item to an index engine/platform for storage. The transformed first metadata item stored at the index engine/platform may be user searchable. A plurality of transformed first metadata items associated with the first client identifier and a same backup identifier may be combined into a single combined transformed first metadata item at the first client device. A number of search nodes may be increased to accelerate handling of metadata items stored at the metadata bus. On the other hand, a number of search nodes may be decreased in response to a determination that the metadata bus is not full.

In one embodiment, for each second data item stored at a second client device to be backed up, an associated second metadata item is extracted at the second client device. The second metadata item is transformed at the second client device based on the predefined metadata definition. A second client identifier and the backup identifier are associated with the transformed second metadata item at the second client device. The transformed second metadata item is transferred from the second client device to the metadata bus of the search cluster.

Transforming the first/second metadata item based on the predefined metadata definition comprises generating a metadata item/message for the first/second data item (e.g., a file)

according to a predefined format using the extracted metadata associated with the first/second data item. The transformed metadata item may comprise metadata key-value pairs for such metadata as a file hash, a file type, a file size, a file location, a file create/access/edit date and time, a file name, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
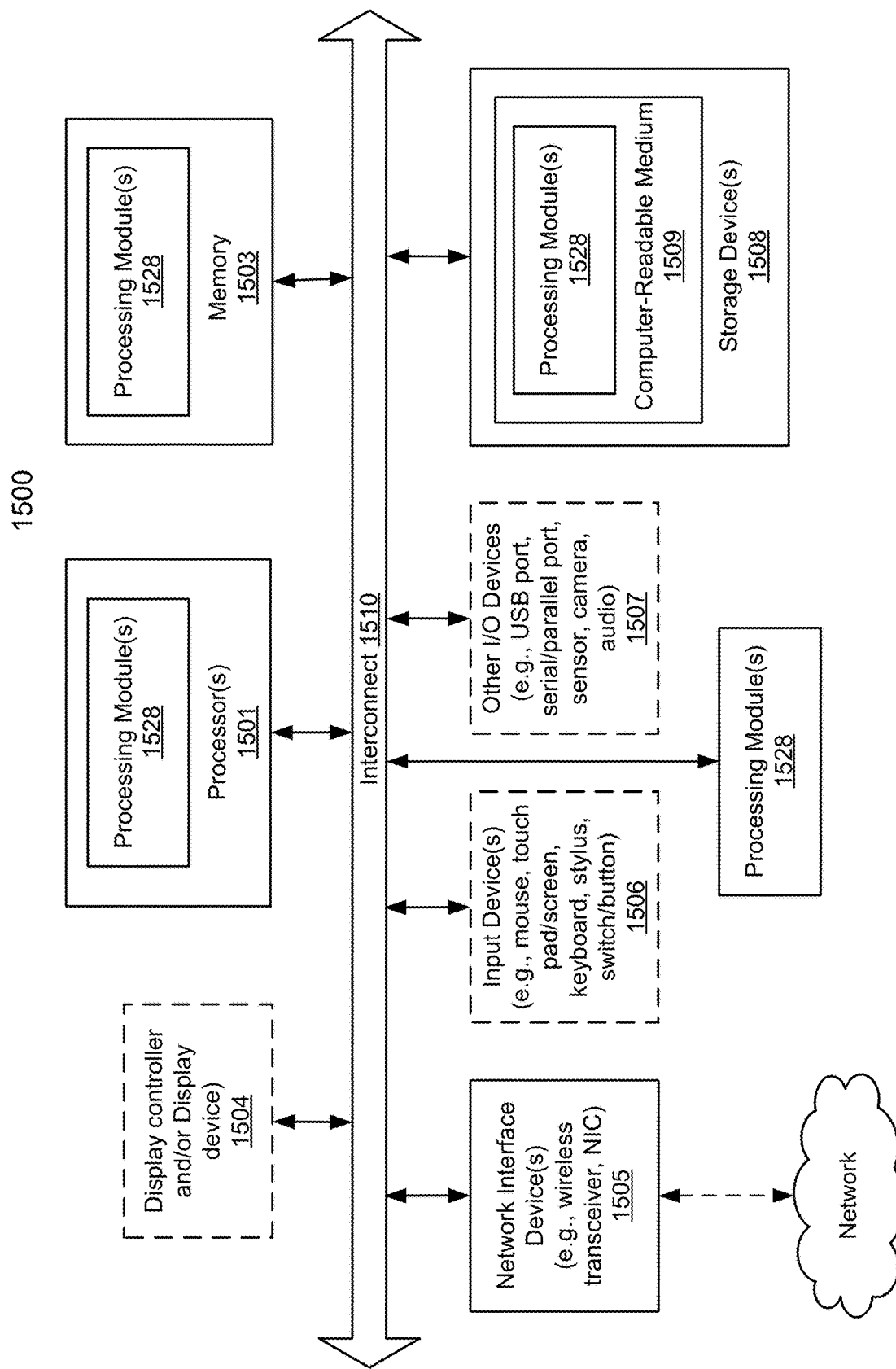
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for storing indexed metadata associated with backed up data, comprising:
for each first data item stored at a first client device to be backed up, extracting, at the first client device, an associated first metadata item;
transforming, at the first client device, the first metadata item based on a predefined metadata definition;
associating, at the first client device, a first client identifier and a backup identifier with the transformed first metadata item;
transferring the transformed first metadata item from the first client device to a metadata bus of a search cluster; and
increasing a number of search nodes to accelerate handling of metadata items stored at the metadata bus.

2. The method of claim 1, wherein the first data item to be backed up is a file, and wherein transforming the first metadata item based on a predefined metadata definition comprises generating a metadata item for the file according to a predefined format using the extracted associated first metadata item associated with the file.

3. The method of claim 1, further comprising transferring the first data item to be backed up from the first client device to a backup appliance.

4. The method of claim 1, wherein a search node of the search cluster retrieves the transformed first metadata item from the metadata bus and transfers the transformed first metadata item to an index engine/platform for storage, and wherein the transformed first metadata item stored at the index engine/platform is user searchable, the transformed first metadata item retrieved by the search node being removed from the metadata bus, a number of search nodes being reduced if a number of the transformed metadata items in a metadata queue is below a predefined threshold.

5. The method of claim 1, further comprising combining, at the first client device, a plurality of transformed first metadata items associated with the first client identifier and a same backup identifier into a single combined transformed first metadata item; and determining that the metadata bus is not full.

6. The method of claim 1, further comprising decreasing a number of search nodes in response to a determination that the metadata bus is not full.

7. The method of claim 1, further comprising:
for each second data item stored at a second client device to be backed up, extracting, at the second client device, an associated second metadata item;
transforming, at the second client device, the second metadata item based on the predefined metadata definition;
associating, at the second client device, a second client identifier and the backup identifier with the transformed second metadata item; and
transferring the transformed second metadata item from the second client device to the metadata bus of the search cluster.

8. A non-transitory machine-readable medium having instructions stored therein, which when executed by a processor, cause the processor to perform operations for storing indexed metadata associated with backed up data, the operations comprising:
for each first data item stored at a first client device to be backed up, extracting, at the first client device, an associated first metadata item;
transforming, at the first client device, the first metadata item based on a predefined metadata definition;
associating, at the first client device, a first client identifier and a backup identifier with the transformed first metadata item;
transferring the transformed first metadata item from the first client device to a metadata bus of a search cluster; and
increasing a number of search nodes to accelerate handling of metadata items stored at the metadata bus.

9. The non-transitory machine-readable medium of claim 8, wherein the first data item to be backed up is a file, and wherein transforming the first metadata item based on a predefined metadata definition comprises generating a metadata item for the file according to a predefined format using the extracted associated first metadata item associated with the file.

10. The non-transitory machine-readable medium of claim 8, the operations further comprising transferring the first data item to be backed up from the first client device to a backup appliance.

11. The non-transitory machine-readable medium of claim 8, wherein a search node of the search cluster retrieves the transformed first metadata item from the metadata bus and transfers the transformed first metadata item to an index engine/platform for storage, and wherein the transformed first metadata item stored at the index engine/platform is user searchable, the transformed first metadata item retrieved by the search node being removed from the metadata bus, a number of search nodes being reduced if a number of the transformed metadata items in a metadata queue is below a predefined threshold.

12. The non-transitory machine-readable medium of claim 8, the operations further comprising combining, at the first client device, a plurality of transformed first metadata items associated with the first client identifier and a same backup identifier into a single combined transformed first metadata item; and determining that the metadata bus is not full.

13. The non-transitory machine-readable medium of claim 8, the operations further comprising decreasing a number of search nodes in response to a determination that the metadata bus is not full.

14. The non-transitory machine-readable medium of claim 8, the operations further comprising:
for each second data item stored at a second client device to be backed up, extracting, at the second client device, an associated second metadata item;
transforming, at the second client device, the second metadata item based on the predefined metadata definition;
associating, at the second client device, a second client identifier and the backup identifier with the transformed second metadata item; and
transferring the transformed second metadata item from the second client device to the metadata bus of the search cluster.

15. A data processing system, comprising:
a processor; and
a memory coupled to the processor to store instructions, which when executed by the processor, cause the processor to perform operations for storing indexed metadata associated with backed up data, the operations including:
for each first data item stored at a first client device to be backed up, extracting, at the first client device, an associated first metadata item;
transforming, at the first client device, the first metadata item based on a predefined metadata definition;
associating, at the first client device, a first client identifier and a backup identifier with the transformed first metadata item;
transferring the transformed first metadata item from the first client device to a metadata bus of a search cluster; and
increasing a number of search nodes to accelerate handling of metadata items stored at the metadata bus.

16. The data processing system of claim 15, wherein the first data item to be backed up is a file, and wherein transforming the first metadata item based on a predefined metadata definition comprises generating a metadata item for the file according to a predefined format using the extracted associated first metadata item associated with the file.

17. The data processing system of claim 15, the operations further comprising transferring the first data item to be backed up from the first client device to a backup appliance.

18. The data processing system of claim 15, wherein a search node of the search cluster retrieves the transformed first metadata item from the metadata bus and transfers the transformed first metadata item to an index engine/platform for storage, and wherein the transformed first metadata item stored at the index engine/platform is user searchable, the transformed first metadata item retrieved by the search node being removed from the metadata bus, a number of search nodes being reduced if a number of the transformed metadata items in a metadata queue is below a predefined threshold.

* * * * *